United States Patent [19]
Herring et al.

[11] 3,715,668
[45] Feb. 6, 1973

[54] AIR-LAUNCHED RADIO APPARATUS

[75] Inventors: Theodore C. Herring, New Hope; Ernest F. Bracht, Jenkintown; Robert E. Ainslie, Glenside; Eugene M. Todd, Doylestown; Joseph J. Franz, Philadelphia, all of Pa.

[73] Assignee: The United States of America as represenced by the Secretary of the Army

[22] Filed: Sept. 26, 1967

[21] Appl. No.: 670,807

[52] U.S. Cl. ................... 325/112, 102/35, 102/37.1, 102/4
[51] Int. Cl. ............................................. H04b 1/02
[58] Field of Search ...... 325/112, 114; 343/706, 897; 244/1, 138

[56] References Cited
UNITED STATES PATENTS

| 2,551,609 | 5/1951 | Kohr et al. | 325/112 |
| 2,992,793 | 7/1961 | Devantier | 244/1 |
| 3,273,835 | 9/1966 | Holt et al. | 244/138 |

*Primary Examiner*—Samuel Feinberg
*Assistant Examiner*—Richard E. Berger
*Attorney*—Henry Hansen and E. J. Brower

[57] ABSTRACT

An air-deliverable package for radio apparatus having a self-deploying antenna system including a flexible RF radiating element and laterally projecting, flexible ground plane elements which are foldable about a packed main parachute received within a tubular container which, in turn, is detachably connected to the aft end of the package and is separated therefrom by deployment of a pilot chute to enable deployment of the main parachute and the antenna system.

11 Claims, 2 Drawing Figures

PATENTED FEB 6 1973

3,715,668

INVENTORS
THEODORE C. HERRING
ERNEST F. BRACHT
ROBERT E. AINSLIE
EUGENE M. TODD
JOSEPH J. FRANZ

BY

ATTORNEYS

AIR-LAUNCHED RADIO APPARATUS

The invention described herein may be manufactured and used by or for the Government of the United States of America for governmental purposes without the payment of any royalties thereon or therefor.

BACKGROUND OF INVENTION

This invention primarily relates to radio apparatus which is packaged for delivery from an aircraft to an optimum location and which includes a compatible, self-deploying antenna system. Previously known air-delivered radio apparatus has included antenna systems which are subject to damage as by parachute deployment or by impact or entanglement with trees and other obstructions on the ground. While equipment has been developed for erecting an antenna system once the air-delivered apparatus has landed, the inclusion of known antenna erection equipment detrimentally increases the cost, size and weight of the apparatus. Additionally, in certain reconnaissance situations, it is desirable that the apparatus be deliverable with greater certainty to a position in the intervening space above underlying shrubbery and undergrowth and below the upper canopy of the trees in a wooded area.

BRIEF SUMMARY OF INVENTION

It is the general purpose of this invention to provide packaged radio apparatus having a simple, inexpensive, self-deploying antenna system which is deliverable by an aircraft and is compact, easy to fabricate, and not subject to the defects of previously known air-delivered radio apparatus. Briefly, this is accomplished by providing a forward package having a self-deploying antenna system including a flexible energy radiating element and a plurality of flexible ground plane elements which are bendable to encircle a packaged main parachute. The antenna encircled main chute is received within a tubular container which is automatically detachable from the forward package for simultaneous deployment of the main chute and the antenna system. In a more specific sense, the invention comprehends a ground plane antenna array wherein the elements include flexible blades which are wrapped with insulating tape and are fixed at one end to a hub assembly having a configuration such that the ground plane elements tend to extend generally radially of the package axis and slightly deflected from a plane normal to the package axis for optimum effectiveness.

DETAILED DESCRIPTION OF PREFERRED EMBODIMENT

Figure 1:
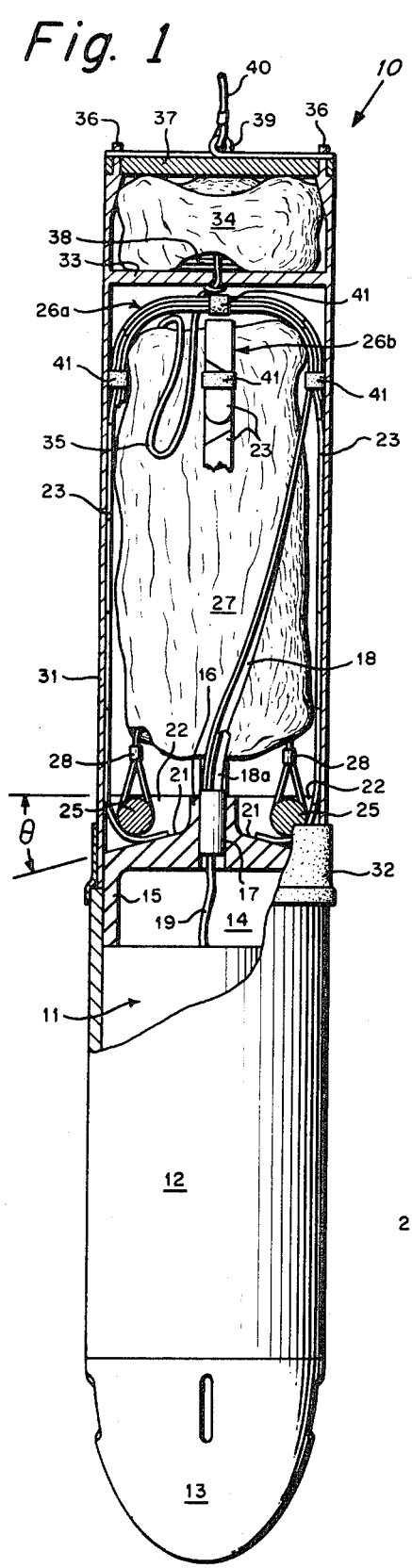
FIG. 1 is a longitudinal view of apparatus according to the invention with portions broken away.

Referring now to FIG. 1, the apparatus 10 includes radio apparatus which is broadly represented by a block 11 and may have a power supply such as a battery and desired electronic components such as a radio transmitter and a sensor activated switch, none of which are shown. The radio apparatus 11 is packaged within a forward tubular container 12 of fiberglass. An apertured nose cone 13, within which may be appropriately mounted a sensor such as a microphone, not shown, is fixed to and closes the forward end of the tube 12; and an aluminum antenna hub assembly 14 protrudes from and closes the other end of the tube 12.

Figure 2:
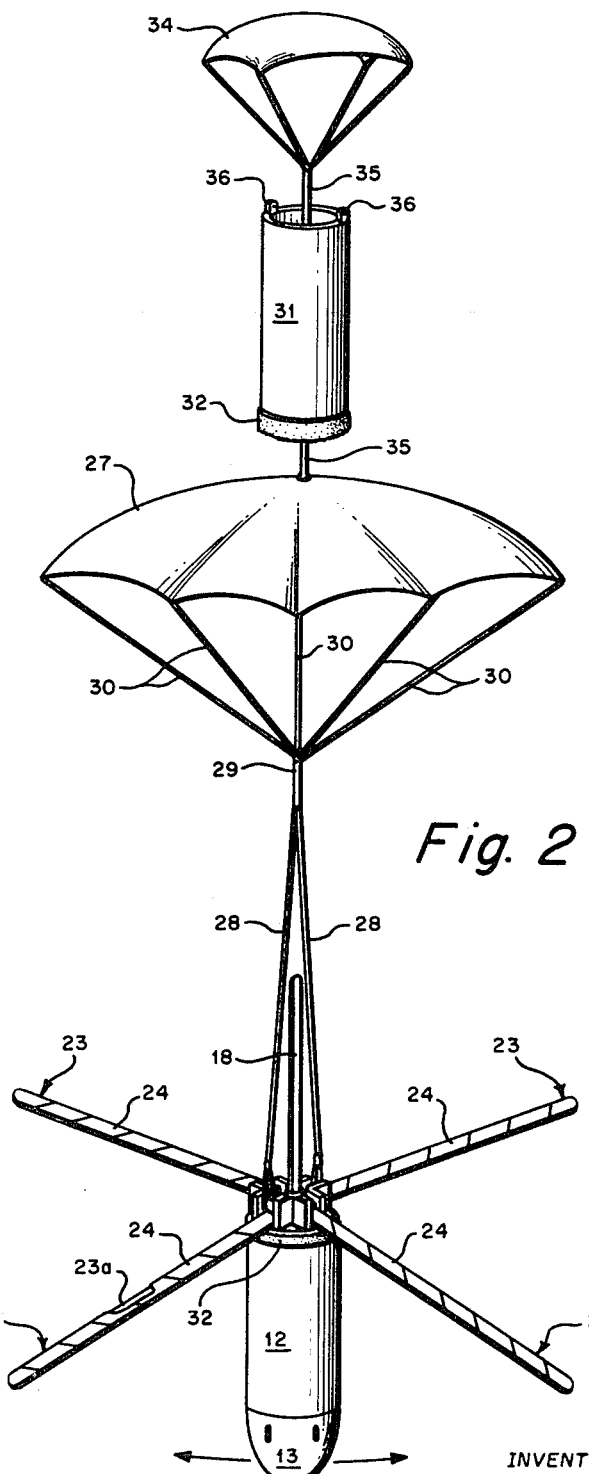
FIG. 2 is an isometric view of the apparatus of FIG. 1 as deployed during descent after launch from an aircraft.

More particularly, the hub 14 has a generally cylindrical configuration and includes a longitudinally depending annular flange 15 which is partially received within and is fixed to the aft end of the tube 12 as by screws, not shown. The hub 14 also includes a coaxially-bored boss portion 16 protruding longitudinally of the tube 12 within which is fixed an insulator bushing 17 which, in turn, supports a radio frequency radiating antenna element 18 extending therefrom. The radiating element 18 is made of a strip of resilient, flexible sheet steel, tends to erect itself into an operating position in alignment with the extension of the longitudinal axis of the tube 12 with the assistance of a shorter, contiguous, flexible steel spring element 18a and is electrically connected to the radio apparatus 11 by an insulated lead 19. The hub 14 has four symetrically positioned, uniformly inclined surfaces 21 extending radially of the axis of the hub 14 from the boss between a respective pair of parallel plates 22 extending longitudinally of the hub 14. The ends of four ground plane antenna elements 23 are electrically and mechanically connected as by screws, not shown, to respective ones of the surfaces 21 in cantilevered arrangements so that the elements 22 normally tend to extend generally radially of the axis of the hub 14 and of the tube 12 in alignment with the respective surfaces 21 and the extensions thereof. The elements 23 are made of flexible, resilient steel strips 23a similar to that used in retractable tape measures, and have their free ends wrapped, as indicated in FIG. 2, with tape 24 of plastic impregnated cloth.

The inclination of the surfaces 21 through an angle $\theta$ from a plane normal to the axis of the hub 14 is of a predetermined magnitude such as is shown to insure that an optimum antenna pattern will be obtained. More particularly, the antenna structure shown provides a vertically polarized, omnidirectional radiation field strength pattern of toroidal configuration which is circular in axially normal planes and in axially aligned planes extending to either side of the element 18.

Each of the pairs of parallel plates 22 supports a respective roller 25 which extends therebetween in spaced relation to the surface 21 so that the respective ground plane element 23 may be interposed. More particularly, the rollers 25 are positioned adjacent a longitudinal extension of the tube 12 for serving as guides about which the ground plane elements 23 may be folded toward oppositely directed, abutting engagement with the free end of the diametrically opposite element 23 to form transversely arranged loops 26a and 26b. The loops 26a and 26b extend longitudinally from the tube 12 and are large enough to encircle a folded main parachute 27, the free end of the radiating element 18 being included in one of the loops 26a.

Additionally, two of the rollers 25 having diametrically opposed positions are connected to the looped ends of a riser bridle 28 whose midpoint is connected by a riser 29 to the ends of suspension lines 30 which are connected to the main chute 27. It is preferred that the bridle 28 have a sufficient length as shown in FIG. 2 to insure that clearance with respect to the radiating element 18 extended in operative position will be provided upon chute deployment. The unfolded main chute 27 preferably has a flat, circular configuration so that the chute will tend to be unstable for a purpose hereinafter explained. For example, the parachute 27 may be fabricated from 16 nylon gores having an isosceles triangular configuration and an apex angle of 22½° so that the chute 27 lies essentially flat on a planar surface. The size of the chute 27 and the length of the suspension lines 30 may be ascertained by one skilled in the art as influenced by the weight of the package to be suspended therefrom, the air speed at which the apparatus 10 is to be launched, and the desired descent rate according to permissible impact loading, as for example, 25 feet per second, so that the chute 27 can oscillate without collapsing.

The main chute 27 which is encircled by the flexible antenna element loops is received within a cardboard tube 31, the forward end of the tube 31 having been slid onto the projecting lateral periphery of the hub 14 and into abuttment with the tube 12 and being secured to the tube 12 by a turn of adhesive paper masking tape 32. The tube 31 includes a circular divider 33 of wood which is fixed in a position inwardly of the aft end of the tube 31 adjacent the antenna encircled main chute 27 to form a pilot chute compartment for receiving a spring-loaded, nylon pilot chute 34. A static line 35 interconnects the pilot chute 34 and the main parachute 27 with the divider 34. The aft end of the tube 31 is provided at its periphery with a pair of apertured studs 36 and is closed by a circular cover 37 having apertures through which the studs 36 protrude. A pilot chute spring 38 attached at one end to the center of the square pilot chute 34 is maintained in compression by the cover 37 which is held in pilot chute retaining position by a pin 39 extending through the studs 36 and having a lanyard 40 attached thereto.

In assembling the apparatus 10, the bridle 28 is attached to diametrically opposite rollers 25, and diametrically opposite ground plane elements 23 are folded in overlying relationship to form the loops 26a and 26b, the free ends of the antenna elements 22 and 18 being held to the loops 26a or 26b by a series of turns or loops 41 of paper masking tape. It is important that the width and thickness of the tape loops 41 be small enough so that deployment of the main chute 27 will cause their failure in order that the antenna elements 18 and 23 be released. For example, a single turn of one-quarter inch paper masking tape which overlaps on one side only of the stacked configuration of antenna elements encircled thereby has been found to satisfactorily fail upon chute deployment. The rollers 25 prevent crimping of the antenna elements 23 during the loop forming process, which crimps could cause mechanical failure of the antenna elements 23 or separation thereof during the deployment of the parachute 27 upon landing. The folded main chute 27 is then placed within the cage formed by the transverse loops 26a and 26b, and the cardboard tube 31 is slid over the elements 23 and attached to the tube 12.

Upon ejection from an aircraft, the lanyard 40 is actuated to remove the spring pin 38 for enabling the pilot chute spring 38 to force the ejection of the cover 37 and the pilot chute 34 into the air stream. The sudden deployment of the pilot chute 34 causes the tape 32 to fail so that the tube 31 is withdrawn from envelopment of the main chute 27 by the static line 35. The impinging air stream and the extended static line 35 cause the main chute 27 to deploy and effect consequential failure of the tape loops 41 so that deployment of the antenna elements 18 and 23 occurs. The taped covering 24 of the elements 23 not only provides sufficient electrical insulation to prevent harmful electrical contact between the element 18 and any of the elements 23 but also adds structural integrity to the flexible elements 23. In the event that partial mechanical failure of an element 23 occurs, the tape 24 maintains the appropriate length for the element 23. The free ends of the elements 23 are freely flexible to permit the descent of the tube 12 through tree branches so that the microphone or other sensor carried thereby may be appropriately positioned in the intervening space between the upper jungle canopy and the underlying shrubs, the main chute 27 being entangled in the trees. As indicated above, it is preferred that the main chute be unstable in order that the tube 12 will oscillate like a pendulum from vertical alignment during descent so that there is a greater possibility that the suspension lines 30 and/or the main chute 27 will become entangled in the tree branches of the upper jungle canopy.

The above described compact apparatus thereby avoids the above indicated defects of the prior art. A rugged radio apparatus having a simple, inexpensive self-deploying antenna system which is deliverable from aircraft as desired to the intervening space between the upper canopy and underlying shrubs in a wooded area has been provided by the invention.

It is to be understood, of course, that the foregoing disclosure relates only to a preferred embodiment of the invention and that numerous modifications or alterations may be made without departing from the spirit and scope of the invention as set forth in the appended claims.

We claim:

1. Apparatus comprising:
a container having an aft end for housing radio apparatus;
a radiating antenna element of flexible resilient material connected at one end to and tending to extend from said aft end of said container;
a plurality of ground plane antenna elements each made of flexible, electrically conducting material and having an end connected to said aft end of said container, said elements tending to extend themselves generally radially of an axis for forming a ground plane;
a tube detachably connected at one end to said aft end of said container; and
a main parachute connected to said container and received within said tube and encircled by said antenna elements received within said tube.

2. Apparatus according to claim 1 wherein:
said main parachute comprises an unstable chute which, when deployed, tends to nutate said container depending therefrom during descent.

3. Apparatus according to claim 2 wherein:
said main parachute has a flat, circular configuration and is connected to said aft end of said container.

4. Apparatus according to claim 1 further comprising:

means for detaching said tube from said container to facilitate deployment of said main parachute and said antenna elements.

5. Apparatus according to claim 4 wherein said means for detaching includes:
   pilot chute means connected to said tube and received within the other end thereof; and
   adhesive tape means for securing said one end of said tube to said container until deployment of said pilot chute.

6. Apparatus according to claim 1 further comprising:
   tape means wrapped about the free ends of each of said ground plane elements.

7. Apparatus according to claim 1 further comprising:
   a hub assembly secured to said aft end of said container and having said antenna elements connected thereto; and
   a plurality of guide means connected to said hub assembly and positioned adjacent a respective one of said one end of said ground plane elements for providing a guide about which said ground plane elements are bent to extend longitudinally within said tube from main parachute encircling configurations.

8. Apparatus according to claim 7 wherein:
   said hub assembly has inclined aft surfaces forming a generally truncated conical configuration radially extending towards its lateral periphery; and
   said one ends of said ground plane elements being fixed to and tending to extend generally radially along said inclined surfaces for providing a vertically polarized, omnidirectional radiation field strength pattern of toroidal configuration.

9. Apparatus according to claim 7 wherein said guide means includes:
   a plurality of pairs of parallel plates, each pair being fixed at their peripheries to said hub assembly on opposite sides of a respective one of said ground plane elements; and
   a like plurality of rollers each connected to extend between said plates in a respective pair and adjacent said respective ground plane elements, said main parachute being connected to at least one of said rollers.

10. Apparatus according to claim 9 wherein:
    said ground plane elements are arranged in diametrically opposed pairs; and
    paper tape means securing the free ends of opposing ground plane elements together to form main chute encircling loops, said tape means being breakable to release said elements in response to deployment of said main chute.

11. Apparatus according to claim 10 further comprising:
    a divider secured within said tube and dividing same into a pilot chute compartment and a main chute compartment;
    a pilot chute received within said pilot chute compartment and connected to said divider;
    means connecting said divider with the center said main chute for actuating deployment of said main chute upon withdrawal of said tube from said main chute receiving position in response to deployment of said pilot chute.

* * * * *